US008068494B2

(12) United States Patent
Venkitaraman

(10) Patent No.: US 8,068,494 B2
(45) Date of Patent: Nov. 29, 2011

(54) METHOD AND APPARATUS FOR ROBUST LOCAL MOBILITY MANAGEMENT IN A MOBILE NETWORK

(75) Inventor: Narayanan Venkitaraman, Hoffman Estates, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 3315 days.

(21) Appl. No.: 10/107,861

(22) Filed: Mar. 27, 2002

(65) Prior Publication Data

US 2003/0185196 A1  Oct. 2, 2003

(51) Int. Cl.
*H04L 12/56* (2006.01)
*H04L 12/26* (2006.01)

(52) U.S. Cl. .................. 370/392; 370/221; 370/408

(58) Field of Classification Search .............. 370/230, 370/242, 331, 351, 389, 392, 396, 400, 408, 370/216, 217, 221, 229, 231, 232, 235, 236, 370/328, 329, 393
See application file for complete search history.

(56) References Cited

U.S. PATENT DOCUMENTS

| | | | |
|---|---|---|---|
| 6,195,705 B1 * | 2/2001 | Leung | 709/245 |
| 6,487,605 B1 | 11/2002 | Leung | |
| 6,510,153 B1 | 1/2003 | Inoue et al. | |
| 6,515,974 B1 | 2/2003 | Inoue et al. | |
| 6,947,401 B2 * | 9/2005 | El-Malki et al. | 370/331 |
| 2004/0008664 A1 * | 1/2004 | Takahashi et al. | 370/351 |
| 2004/0072564 A1 * | 4/2004 | Iwahashi et al. | 455/432.1 |
| 2004/0240414 A1 * | 12/2004 | Fan et al. | 370/332 |
| 2005/0120136 A1 * | 6/2005 | Park et al. | 709/242 |

FOREIGN PATENT DOCUMENTS

WO  01167798 A1  9/2001

OTHER PUBLICATIONS

GB Application No. 0419429.6—Examination Report—Jul. 2005—2 pages.
Korean Application No. 10-2004-7015363—Translation of Preliminary Rejection—Jul. 2006—1 page.
Australian Application No. 2003223176—Rejection—Nov. 2005—2 pages.
Australian Application No. 2003223176—Rejection—Dec. 2006—1 page.
Canadian Application No. 2477155—Rejection—Aug. 2007—1 page.

* cited by examiner

*Primary Examiner* — Aung S Moe
*Assistant Examiner* — Feben M Haile

(57) ABSTRACT

A method and apparatus for robust mobility management in a network having a mobile node (MN), a mobility anchor point (MAP), a correspondent node (CN1, CN2), a home agent (HA) and an access router (AR1) and operating under a hierarchical protocol. The mobile node (MN) sends the address (102, 104) of the mobility anchor point (MAP) to the correspondent node (CN1, CN2) and sends the address (106, 108) of the mobile node (MN) on the network of the access router (AR) to the home agent (HA) and to the mobility anchor point (MAP). When failure of the mobility anchor point occurs, the mobile node recovers from the failure by selecting a new mobility anchor point or operating under a non-hierarchical protocol. Failure is detected by an intermediate router or by a correspondent node when messages fail to reach the mobility anchor point. The mobile node (MN) detects failure of the mobility anchor point when messages unexpectedly arrive via the home agent.

4 Claims, 3 Drawing Sheets

METHOD AND APPARATUS FOR ROBUST LOCAL MOBILITY MANAGEMENT IN A MOBILE NETWORK

TECHNICAL FIELD

This invention relates to local mobility management techniques for mobile networks and, in particular, to a method and apparatus for recovering from failure of local mobility management.

BACKGROUND OF THE INVENTION

As the number of wireless devices for voice or data increases, mobile data communication will likely emerge as the technology supporting most communication including voice and video. Mobile data communication will be pervasive in cellular systems such as 3G and in wireless LAN such as 802.11, and will extend into satellite communication.

In IP (Internet Protocol) networks, routing is based on stationary IP addresses, similar to how a postal letter is delivered to the fixed address on the envelope. A device on a network is reachable through normal IP routing by the IP address it is assigned on the network.

When a device roams away from its home network it is no longer reachable using normal IP routing. This results in the active sessions of the device being terminated. Mobile protocols (such as the Hierarchical Mobile Internet protocol (HMIP v4 and v6) or the Mobile IP defined by the Internet Engineering Task Force (IETF) RFC 2002) were created to enable users to keep the same IP address while traveling to a different network (which may even be on a different wireless system), thus ensuring that a roaming individual could continue communication without sessions or connections being dropped. When the mobility functions of mobile protocols are performed at the network layer rather than the physical layer, the mobile device can span different types of wireless and wire-line networks while maintaining connections and ongoing applications. In some applications, such as remote login, remote printing, and file transfers, it is undesirable to interrupt communications while an individual roams across network boundaries. Also, certain network services, such as software licenses and access privileges, are based on IP addresses. Changing these IP addresses could compromise the network services.

The concept of local mobility management is well known in the cellular and IP domains. For instance, in a mobile IP network, the concept of a mobility anchor point (MAP) is defined to support fast mobility. A MAP is a node that enhances handoff performance by acting as a care-of-address (CoA) of the mobile node. Specifically, the mobile node registers the address in the network of the MAP with its home agent and its correspondent nodes and registers its "real CoA" with the MAP. As long as the MAP is not changed, a mobile node need not update its home agent and correspondent nodes. However, if the MAP fails or gets disconnected, the correspondent nodes cannot send packets to the mobile node and packets in transit will be lost. Additionally, it takes a significant amount of time to identify the problem and recover. Meanwhile, all packets sent will be lost.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION OF THE INVENTION

Figure 1:
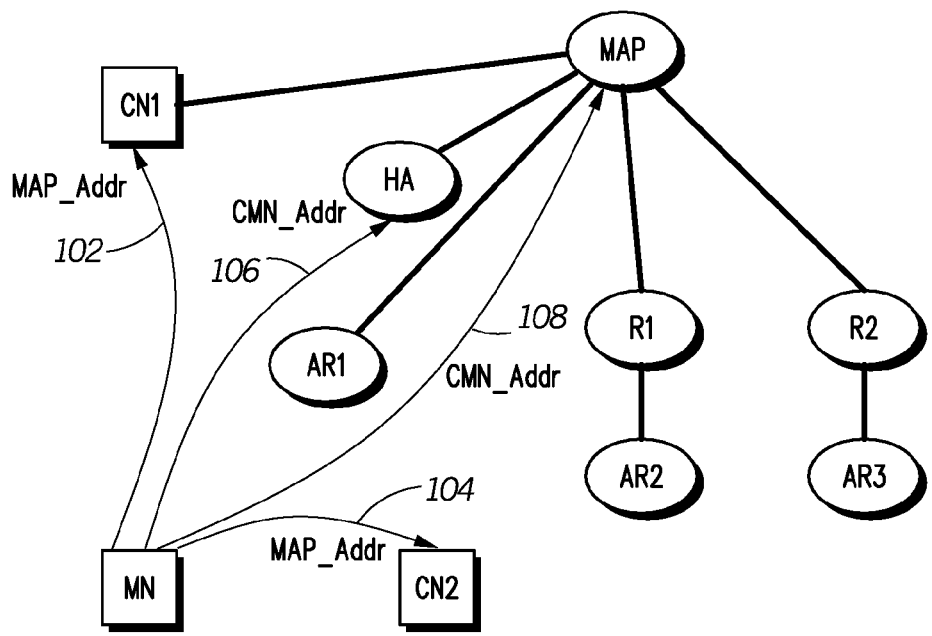
FIG. 1 is a diagrammatic representation of an exemplary network.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

When a network device is capable of roaming away from its home network it is called a Mobile Node (MN). A Mobile Node is a device such as a cell phone, personal digital assistant, automobile computer or portable computer whose software enables network roaming capabilities.

A Correspondent Node (CN) is a device on the network with which the Mobile Node is in communication.

A Home Agent (HA) is a device on the home network, i.e. the network of the Mobile node when it is not roaming. The HA may serve as the default anchor point for communication with the Mobile Node, tunneling packets from a Correspondent Node to the roaming Mobile Node.

An Access Router (AR) or Foreign Agent (FA) is a router that may function as the point of attachment for the Mobile Node when it roams to a foreign network. It delivers information packets to the Mobile Node. Information packets from the CN may be forwarded via the Home Agent or via the Mobility Anchor Point.

The care-of address (CoA) is the address that can be used to reach a Mobile Node when it is on a foreign network. The Home Agent maintains an association between the home IP address of the Mobile Node and its care-of address, which is the current location of the Mobile Node on the foreign or visited network.

Encapsulation is a protocol which allows information packets of a network A, including routing information, to be transmitted across an arbitrary network B by encapsulating the packets of A within packets of B. Encapsulation may also be used to transport packets from one point in a network to another. This process is called Tunneling.

A routing header is an option in the IP header that enables a source to specify, in order, multiple addresses through which a packet must be routed before it reaches its final destination.

In standard Mobile IP, when a MN moves to a new location on the network, all of the Correspondent Nodes and the Home Agent are informed of the new CoA. This generates an excess of communication and increases delay. An alternative approach is a Hierarchical Mobile Internet protocol (HMIP), in which information packets are routed to the MN via a Mobility Anchor Point (MAP). The HA and CNs are each provided with the address of the MAP or an address in the MAPs network which uniquely identifies the mobile node (henceforth denoted by MAP_Addr). In the latter case the MAP can intercept the packet on behalf of the Mobile Node. In either case, the MAP receives the information packets and then forwards the information packets to the MN. When a MN moves to a new location on the network, only the MAP needs to be informed of the move. That is, only devices in the neighborhood of the MN need to be informed of the move. This provides a more efficient network. However, if the MAP fails then communication to all of the CNs is lost.

The method of the invention allows a mobile node to continue receiving packets even when the MAP fails. It also enables the mobile node to discover the problem quickly.

According to the method of the invention, the operation of the Mobile Node is changed as shown in FIG. 1. FIG. 1 shows an exemplary network including a Mobile Node (MN), two Correspondent Nodes (CN1 and CN2), three Access Routers (AR1, AR2 and AR3), a Home Agent router (HA) and a Mobility Anchor Point (MAP). Also shown are two intermediate routers (R1 and R2) indicating that there may be several layers between the MAP and the ARs. Following the Agent Discovery stage, during which AR1 is identified as the current Access Router and MAP as the current Mobility Anchor Point, the Mobile Node registers its current location with the MAP and Home Agent. The mobile node sends a binding update (BU), with MAP_Addr as its CoA, only to the correspondent nodes (CN1 and CN2), shown as links 102 and 104 in FIG. 1. However, it gives its "real CoA" (i.e. its actual address on the network of AR1, denoted by CMN_Addr) to the home agent via link 106. This is in contrast to prior schemes in which the MAP_Addr was sent to the Home Agent. The CMN_Addr is also sent to the MAP via link 108.

As the mobile node moves to a new access router and gets a new CMN_Addr, it sends a BU to both the MAP and its Home Agent, with the CMN_Addr as the CoA. This is in contrast to prior schemes, where the Home Agent was aware only of the MAP_Addr, and no update was needed when the mobile nodes moved to a new access router. Note that when the mobile node performs a handoff, it needs to receive packets seamlessly from the correspondent nodes. There is often very little real-time communication between the home agent and the mobile node—assuming that all correspondents support the binding update (BU) option. So, the roundtrip latency associated with sending a BU to the HA will not affect the performance of the current sessions between the mobile node and its correspondents.

Figure 2:
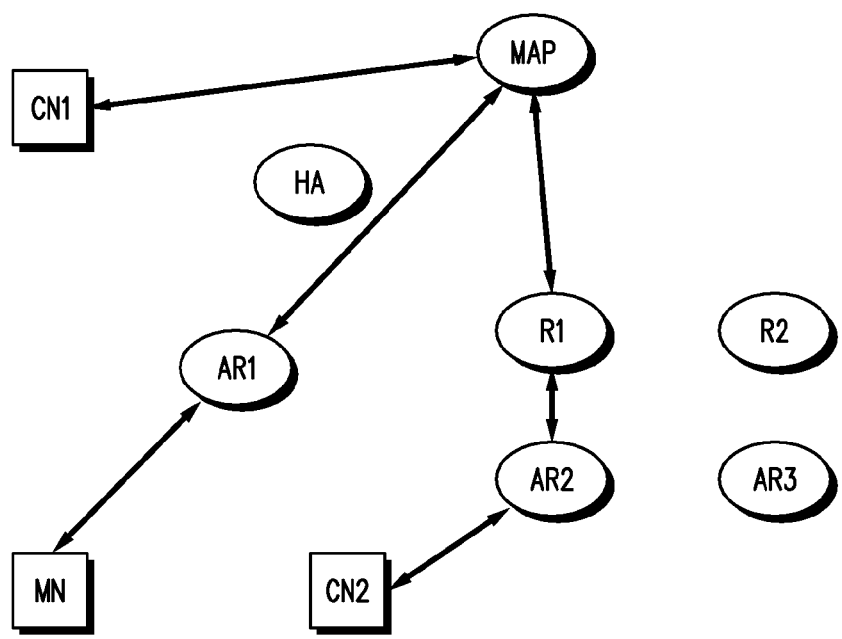
FIG. 2 is a diagrammatic representation of information flow in a network in accordance with the present invention in normal operation.

The operation of the network is also changed according to the method of the invention. In normal operation, as shown in FIG. 2, information flows between the mobile node (MN) and the correspondent nodes (CN1 and CN2) via the Mobility Anchor Point (MAP). The information passes through the access router (AR1) and other routers (R1 and AR2).

When a router tries to send packets with a routing header to another node and finds that the node is unreachable, instead of dropping the packet, the router will process the packet's routing header. In other words, the router will send the packet to the next destination given in the routing header.

Figure 3:
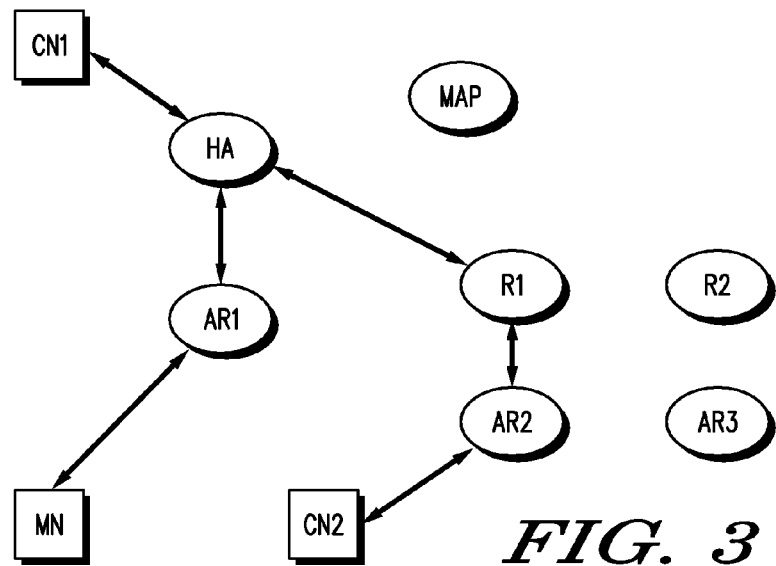
FIG. 3 is a diagrammatic representation of information flow in a network in accordance with the present invention when the MAP fails.

When the MAP fails or gets disconnected from the network, packets from the correspondent node CN2 will reach the last router (R1) on the path to the MAP that is still functional. That router then determines that the packet cannot be sent to the MAP using the standard mechanisms (like routing table/neighbor discovery/ARP). It then processes the routing header and sends the packet to the next entry in the routing header. This entry is the home address of the mobile node. The router then sends the packet to the home network where the home agent HA intercepts the packet. This situation is shown in FIG. 3. The HA, which has the "real CoA" encapsulates the packet to the mobile node. Thus the MN receives the packet even if MAP fails. Also, based on the fact that HA has encapsulated a packet with a routing header containing MAP's address, the MN realizes that the MAP has failed. Note that even if a mobile node uses multiple MAPs, this scheme provides a way for identifying the MAP that has failed. It can then recover by either using a different MAP, if present, or by reverting to base mobile IP.

Figure 4:
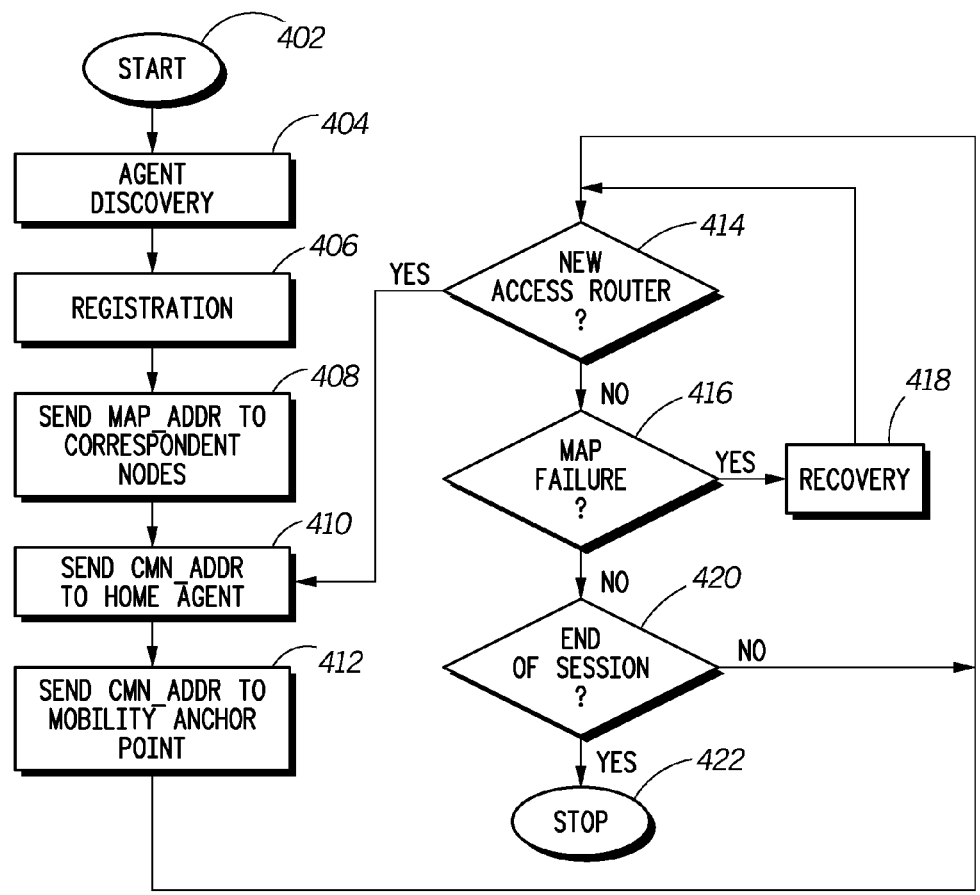
FIG. 4 is a flow chart of an embodiment of the method of the present invention.

FIG. 4 is a flow chart of an embodiment of the operation of a Mobile Node in accordance with the present invention. Following start block 402, the Mobile Node performs Agent Discovery at block 404, during which the Home Agent, Access Routers (Foreign Agents) and Mobility Anchor Points are discovered. The Mobile Node then registers its current network location with the Foreign Agent if there is one and Access Router at block 406. At block 408, the Mobile Node sends the MAP_Addr to any correspondent nodes as its CoA. At block 410, the Mobile Node sends its current network location address (CMN_Addr) to the Home Agent. The CMN_Addr is also sent to the Mobility Anchor Point at block 412. At this point in the process, normal network operation can proceed, with information flowing between the Mobile Node and the Correspondent Nodes via the Mobility Anchor Point. As the Mobile node roams, it may become necessary to perform a hand-off to a new Access Router. At block 414 a check is made to determine if hand-off to a new router is required. If a hand-off is required, as depicted by the positive branch from decision block 414, flow returns to block 410, and the new CMN_Addr is sent to the Home Agent and to the Mobility Anchor Point. If a hand-off is not required, as depicted by the negative branch from decision block 414, flow continues to decision block 416, where a check is made to determine if the Mobility Anchor Point has failed. The failure can be detected rapidly, as described above, since information packets will be received via the Home Agent rather than via the MAP. If the MAP has failed, as indicated by the positive branch from decision block 416, a recovery process is performed at block 418, where a new MAP is selected or the process reverts to a standard Mobile IP. If the MAP has not failed, as indicated by the negative branch from decision block 416, flow continues to decision block 420. If the session is not terminated, normal operation continues and, as indicated by the negative branch from decision block 420, flow returns to block 414. Otherwise, the session ends at termination block 422.

Figure 5:
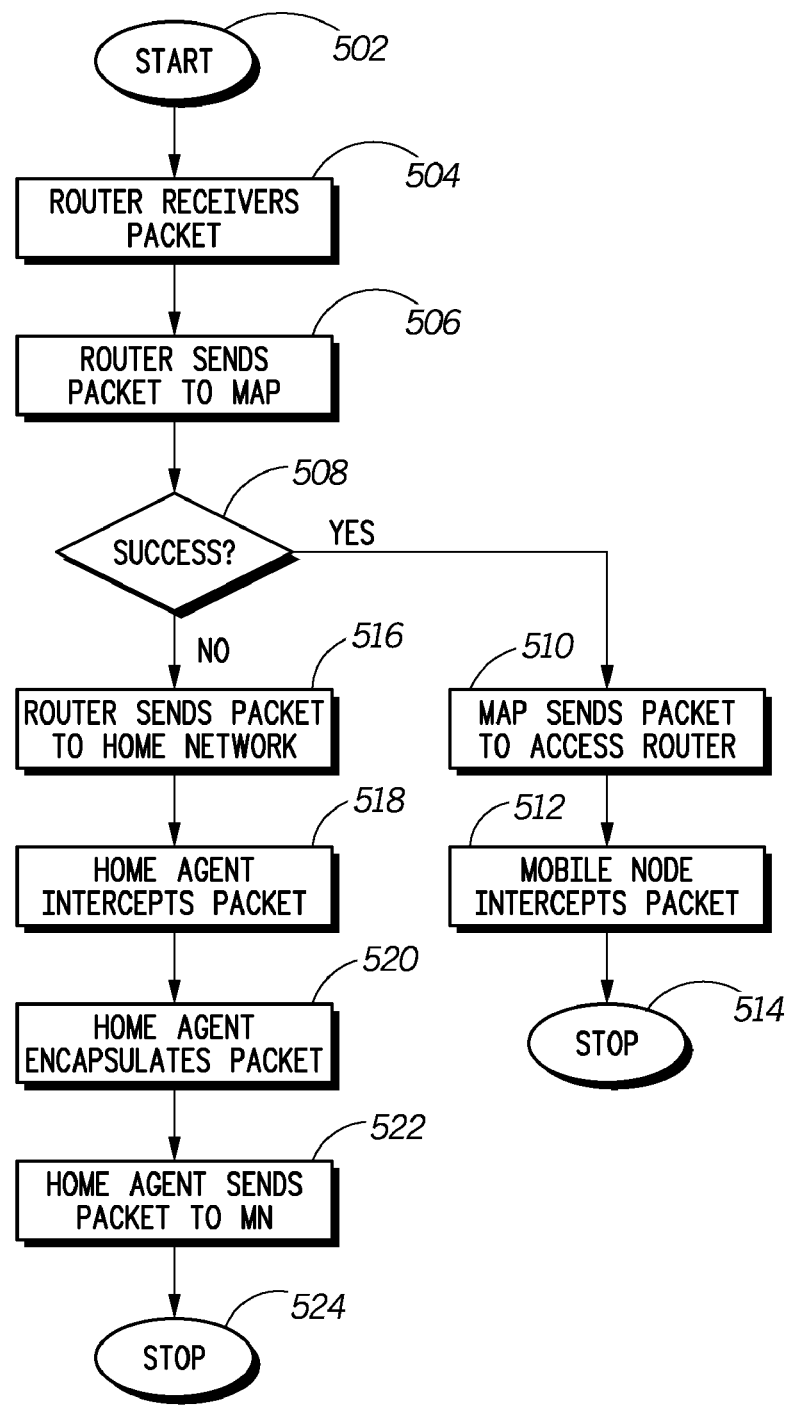
FIG. 5 is a further flow chart of an embodiment of the method of the present invention.

FIG. 5 is a flow chart of an embodiment of the operation of a network in accordance with the present invention. Following start block 502, an information packet in the network from a correspondent node passes through a number of routers until it reaches the router before the Mobility Anchor Point (MAP). At block 504, this router receives the information packet. At block 506, the router tries to send the packet to MAP, as specified in the packet header. (Each correspondent node has the MAP_Addr as the CoA for the Mobile node.) At decision block 508, a check is made to determine if the packet has been received successfully by the MAP. If it has been received, as depicted by the positive branch from decision block 508, the MAP sends the packet to the Access Router (possibly via additional routers). (The MAP has the CMN_Addr as the CoA for the Mobile node). Finally, the packet is received by the Access Router and intercepted by the Mobile node at block 512. However, if the router is unsuccessful in sending the packet to the MAP, as depicted by the negative branch from decision block 508, the router instead sends the packet to the next address in the header at block 516. The next address is the address of the home network. At block 518, the home agent intercepts the packet on the home network. At block 520 the Home Agent encapsulates the packet and, at block 522, sends the packet to the Mobile Node using the CMN_Addr. The process is completed at block 524.

An advantage of the present invention is that it does not require any non-standard enhancement in the CN or the HA. Additionally, it achieves a balance between a pure end-to-end approach and a pure network-based approach. Note that for a pure end-to-end approach, only the changes described with reference to FIG. 4 above need to be implemented. In that case, the CNs will get a 'destination unreachable' ICMP message and will delete the binding as per the standard protocol. They will then send packets to the home address directly. The home agent, which has the "real CoA", can then tunnel the packet to the mobile node. This enables the connection to be maintained. The mobile node can still recognize the failure of the MAP as follows: when the mobile node gets a packet tunneled by the home agent and originally sent by a correspondent in its binding update list, the mobile can verify if the MAP is functional.

Those of ordinary skill in the art will recognize that although the present invention has been described in terms of exemplary embodiments based upon a modification to a Hierarchical Mobile IP network, the method can be applied to a variety of IP based wireless infrastructures, including 3G cellular systems and CGISS wideband networks.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A method for robust mobility management in a network having a mobile node, an access router, a mobility anchor point, a correspondent node, and a home agent, operating under a hierarchical protocol, said method comprising:
  receiving at an intermediate router an information packet, wherein the information packet is intended for transmission between the correspondent node and the mobile node via the mobility anchor point;
  the intermediate router determining if the information packet is successfully transmitted to the mobility anchor point; and
  if the information packet is not successfully transmitted to the mobility anchor point, transmitting the information packet to a next address in a routing header in the information packet.

2. The method of claim 1, wherein the next address is a home address of the mobile node.

3. The method of claim 2 further comprising the home agent intercepting and encapsulating the information packet and transmitting it the mobile node.

4. The method of claim 3 further comprising the mobile node receiving a packet from the home agent and recovering from the failure of the mobility anchor point.

* * * * *

UNITED STATES PATENT AND TRADEMARK OFFICE
CERTIFICATE OF CORRECTION

| | | |
|---|---|---|
| PATENT NO. | : 8,068,494 B2 | Page 1 of 1 |
| APPLICATION NO. | : 10/107861 | |
| DATED | : November 29, 2011 | |
| INVENTOR(S) | : Venkitaraman | |

It is certified that error appears in the above-identified patent and that said Letters Patent is hereby corrected as shown below:

In Column 6, Line 29, in Claim 4, delete "the failure" and insert -- failure --, therefor.

Signed and Sealed this
Twenty-fifth Day of December, 2012

David J. Kappos
*Director of the United States Patent and Trademark Office*